United States Patent [19]

VanderMeer et al.

[11] Patent Number: 5,271,709
[45] Date of Patent: Dec. 21, 1993

[54] DEVICE AND METHOD FOR REPEATEDLY FORMING A PRESELECTED ARRANGEMENT OF CONVEYED ARTICLES

[75] Inventors: Richard H. VanderMeer; Donald J. Simkowski, both of Loveland, Colo.

[73] Assignee: Goldco Industries, Inc., Loveland, Colo.

[21] Appl. No.: 918,425

[22] Filed: Jul. 22, 1992

[51] Int. Cl.⁵ .............................................. B65G 57/14
[52] U.S. Cl. ................... 414/791.7; 198/419.1; 414/794.7
[58] Field of Search ............... 414/794.7, 791.6, 791.7; 198/419.1

[56] References Cited

U.S. PATENT DOCUMENTS

| | | |
|---|---|---|
| 2,949,179 | 8/1960 | Busse . |
| 3,178,007 | 4/1965 | Standley et al. . |
| 3,219,203 | 11/1965 | Jeremiah . |
| 3,659,726 | 5/1972 | Anderson . |
| 3,660,961 | 5/1972 | Ganz . |
| 3,718,246 | 2/1973 | Dardains et al. . |
| 3,788,497 | 1/1974 | Carlson ..................... 414/794.7 X |
| 3,823,813 | 7/1974 | Holt ........................... 198/419.1 X |
| 3,842,570 | 10/1974 | Monaghan . |
| 3,934,713 | 1/1976 | Vander Meer et al. . |
| 3,978,970 | 9/1976 | Reimers . |
| 3,999,648 | 12/1976 | Kennedy . |
| 4,108,061 | 8/1978 | Bowser . |
| 4,154,347 | 5/1979 | Vander Meer et al. . |
| 4,546,443 | 10/1985 | Oguchi et al. . |
| 4,561,817 | 12/1985 | Speltzer et al. . |
| 4,637,509 | 1/1987 | Raudat et al. . |
| 4,642,967 | 2/1987 | Culpepper . |
| 4,748,791 | 6/1988 | Langenbeck . |
| 4,759,673 | 7/1988 | Pearce et al. . |
| 4,809,965 | 3/1989 | Vander Meer et al. . |
| 4,978,275 | 12/1990 | Reid et al. ................... 198/419.1 X |
| 5,065,856 | 11/1991 | Reid et al. . |

Primary Examiner—D. Glenn Dayoan
Attorney, Agent, or Firm—Robert E. Harris

[57] ABSTRACT

Device and method are disclosed for repeatedly forming a predetermined arrangement of conveyed articles. Cylindrical articles, such as cans, are accumulated on a conveying unit at an accumulating area, the articles at the accumulating area being normally in a pattern, such as being in nested relationship. A stop unit is provided to repeatedly allow preselected numbers of articles to pass from the accumulating area on the conveying unit into a sweep area having a sweep unit including sweep arms each of which is utilized to alternately lead and push articles by group through the sweep area to a receiving area, such as a palletizer. The conveying, stop and sweep units are controlled to cause coordinated movement therebetween, the conveying and sweep units being operated at various speeds as each group of articles passes the stop unit. When a particular stagger arrangement, such as a Number One Stagger arrangement, is needed at the receiving area, a repositioning unit is provided adjacent to the stop unit, the repositioning unit removing articles from a first group of passed articles and then inserting the removed articles into a later group of passed articles.

29 Claims, 8 Drawing Sheets

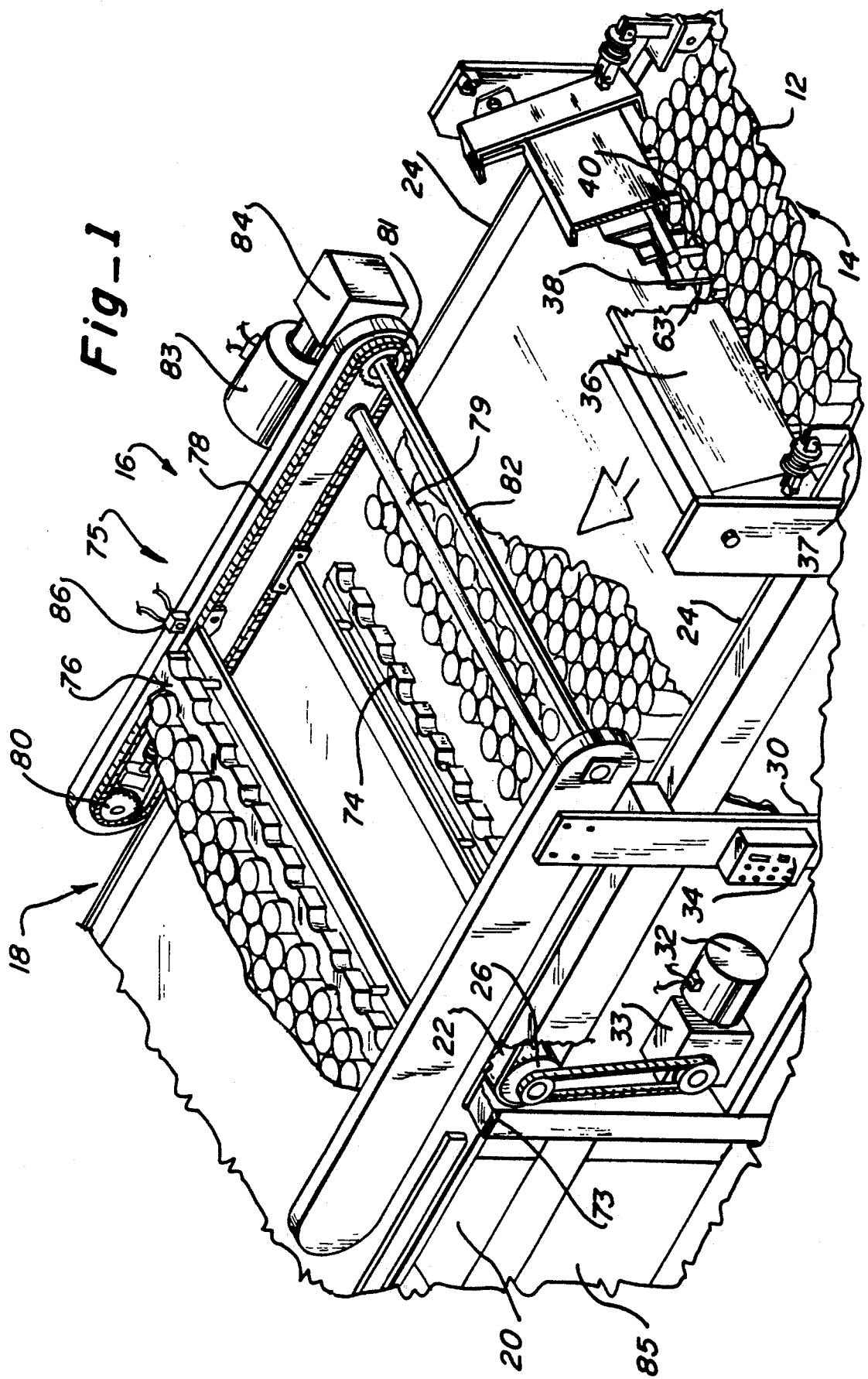
Fig_1

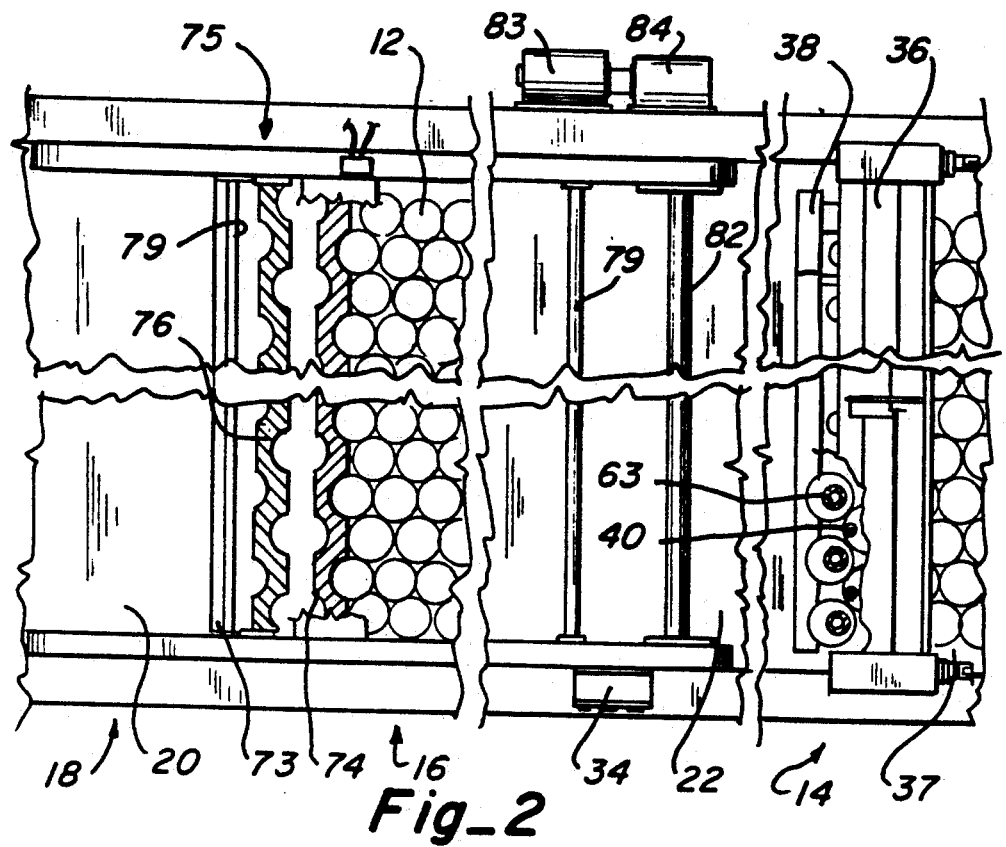
Fig_2
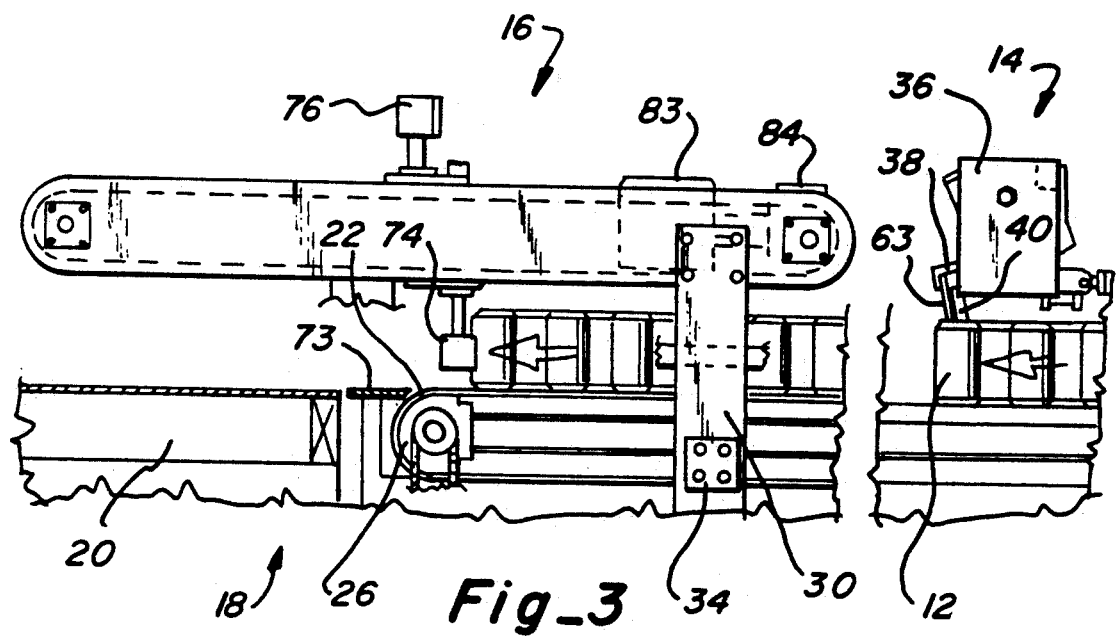
Fig_3

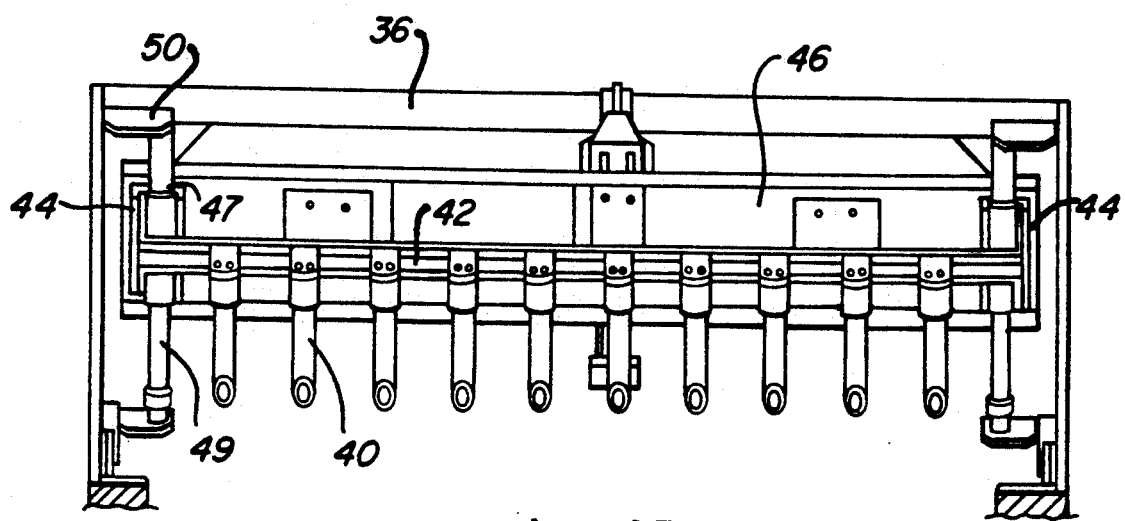
Fig_4B
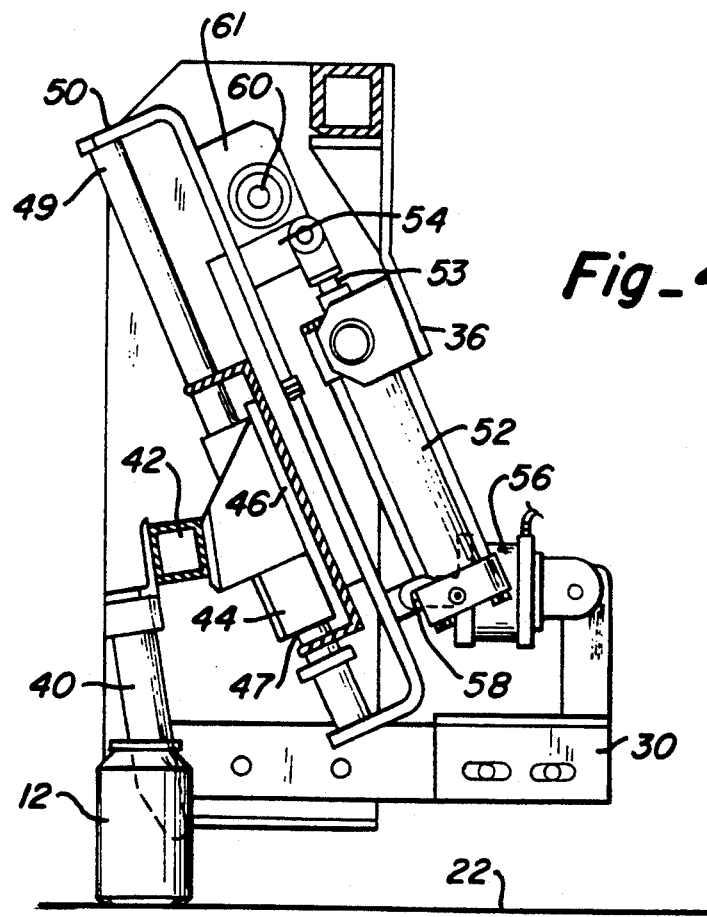
Fig_4A

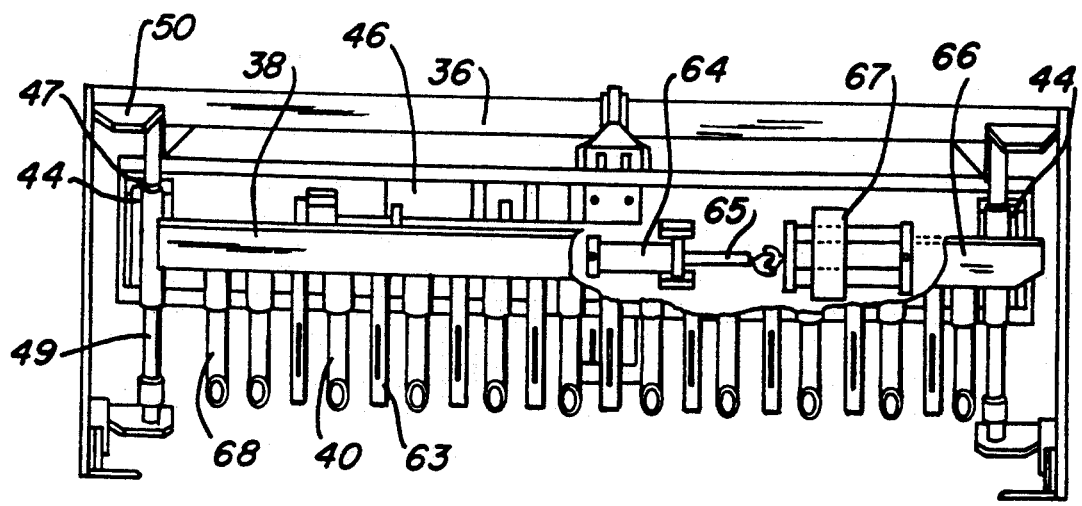
Fig_5B
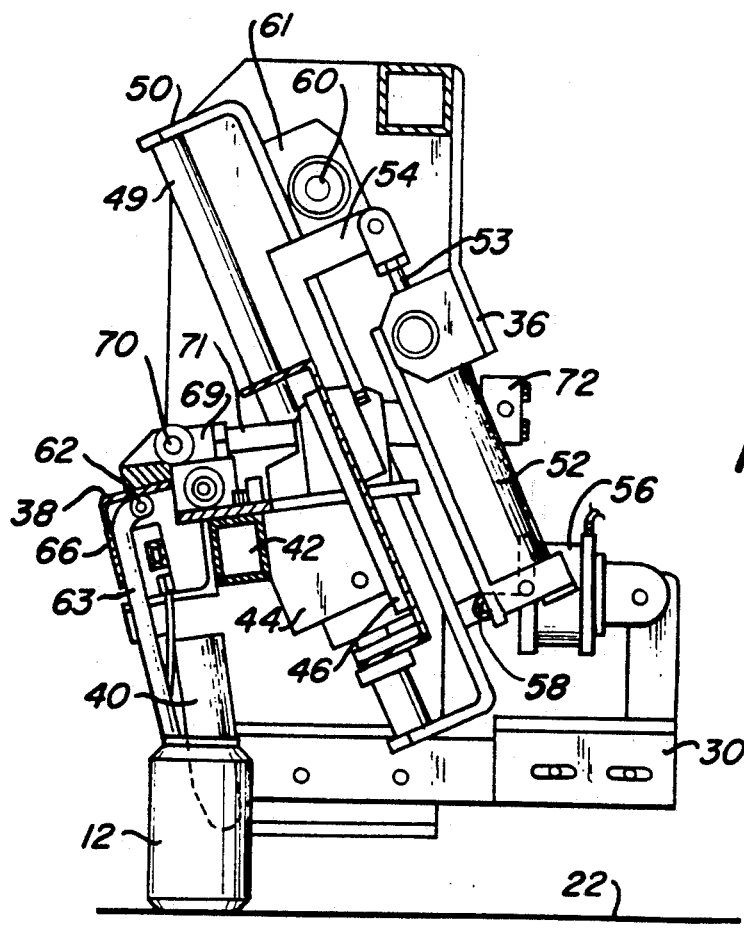
Fig_5A

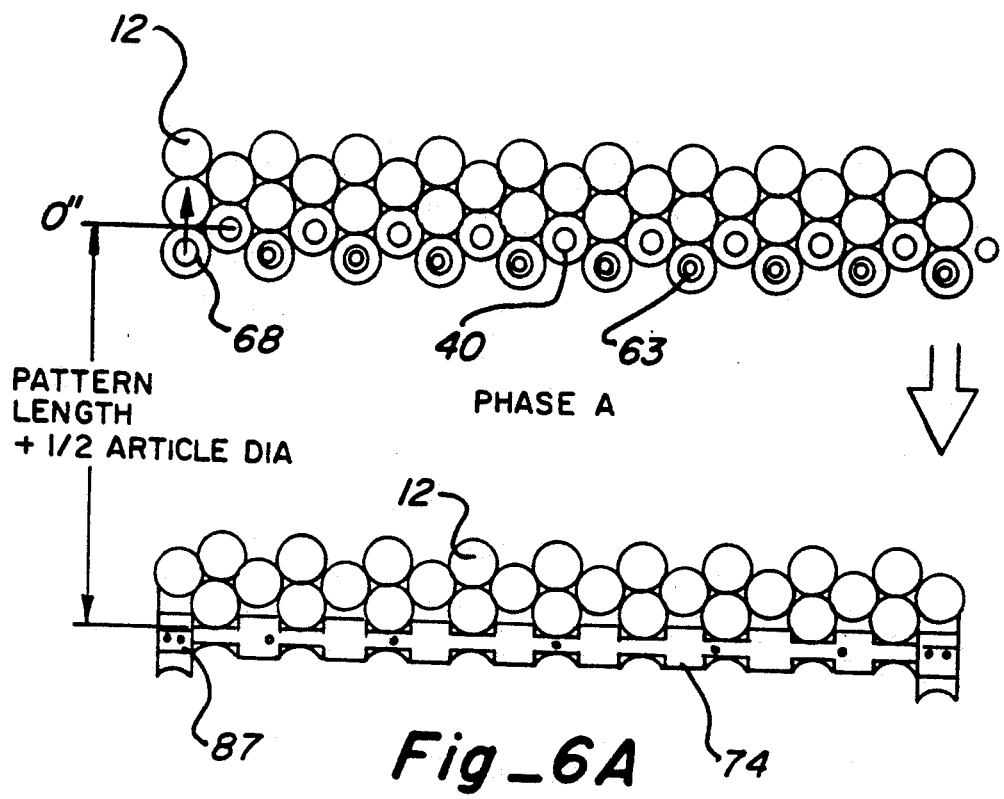
Fig_6A
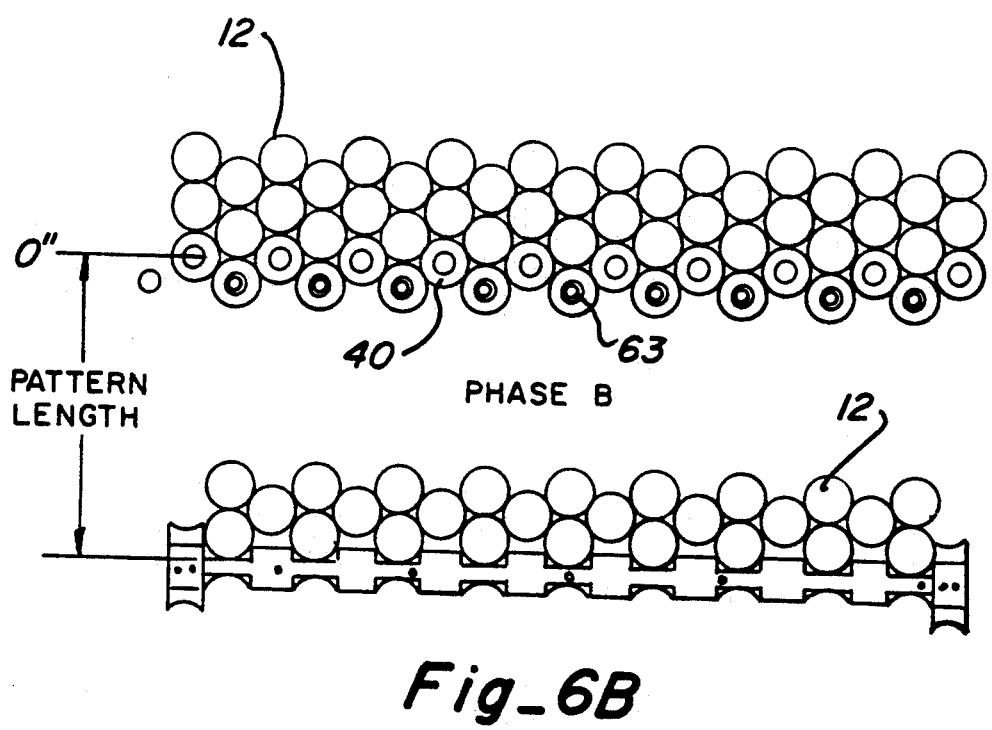
Fig_6B

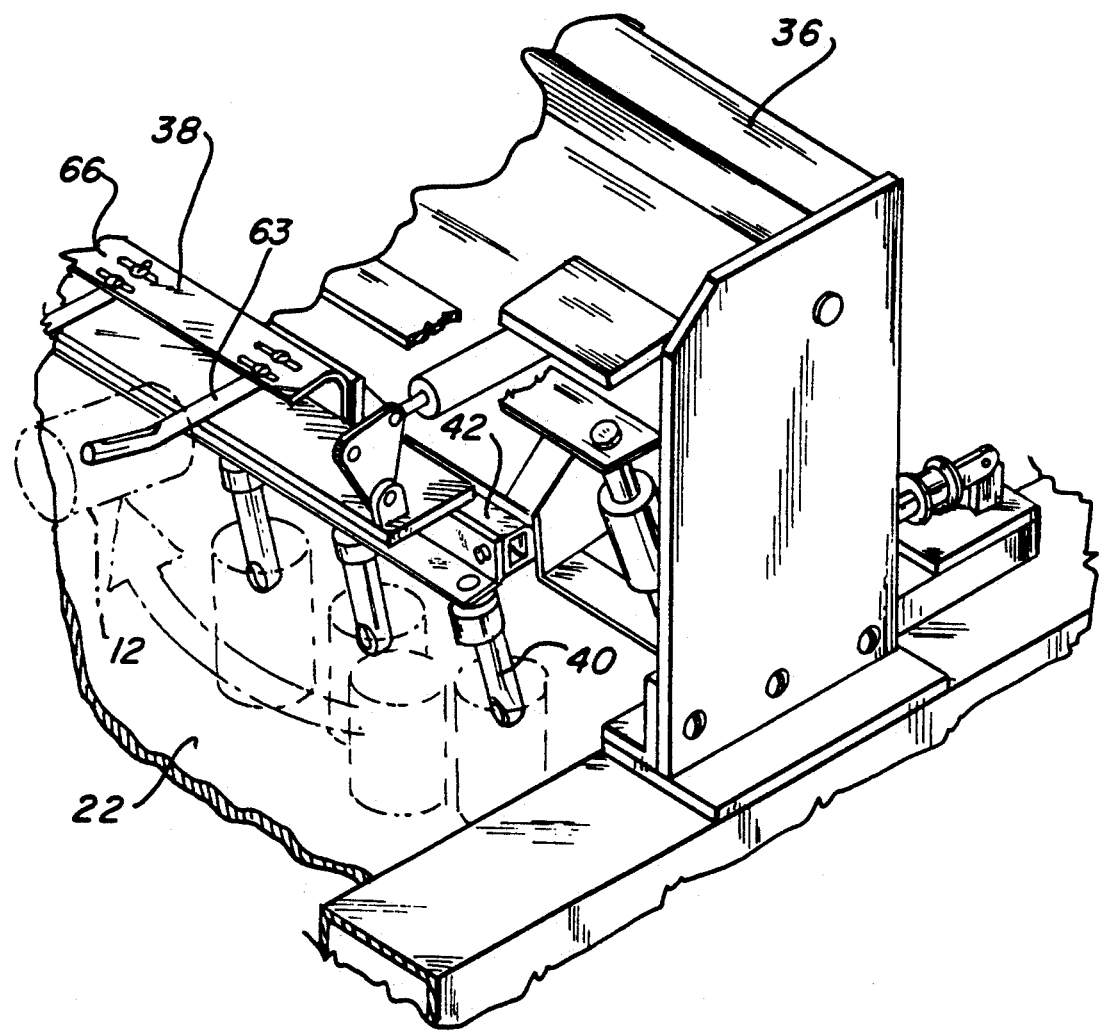
Fig_7

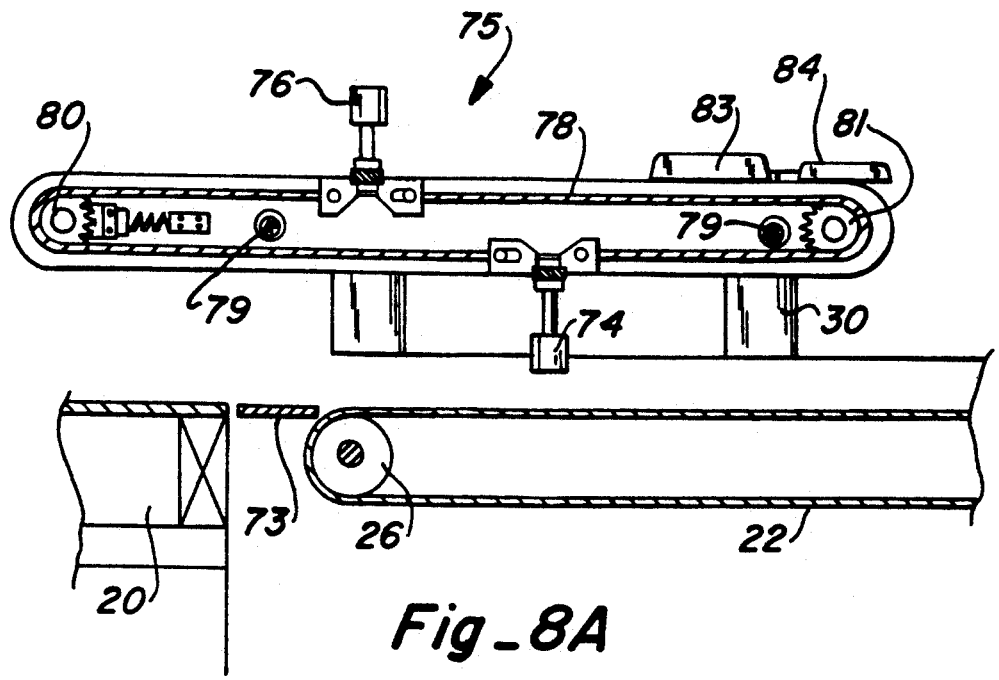
*Fig_8A*
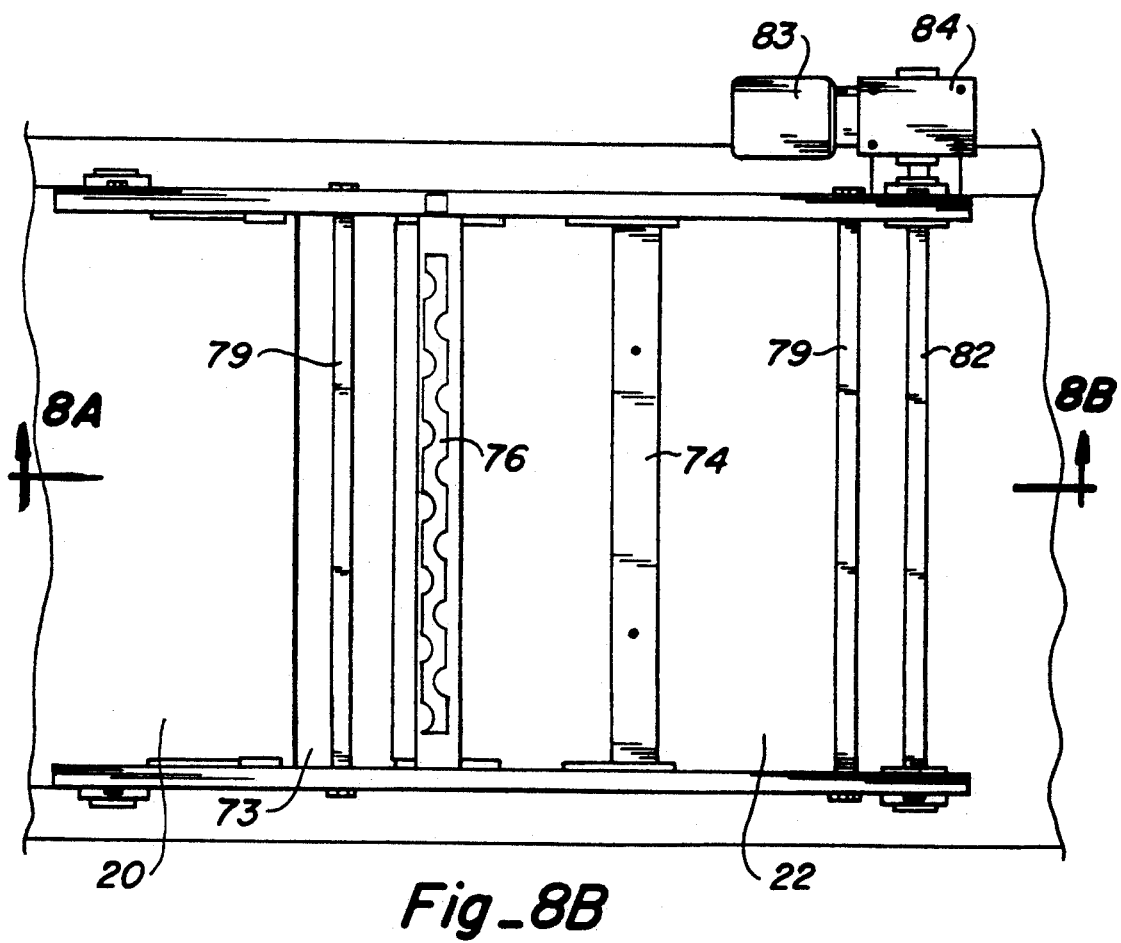
*Fig_8B*

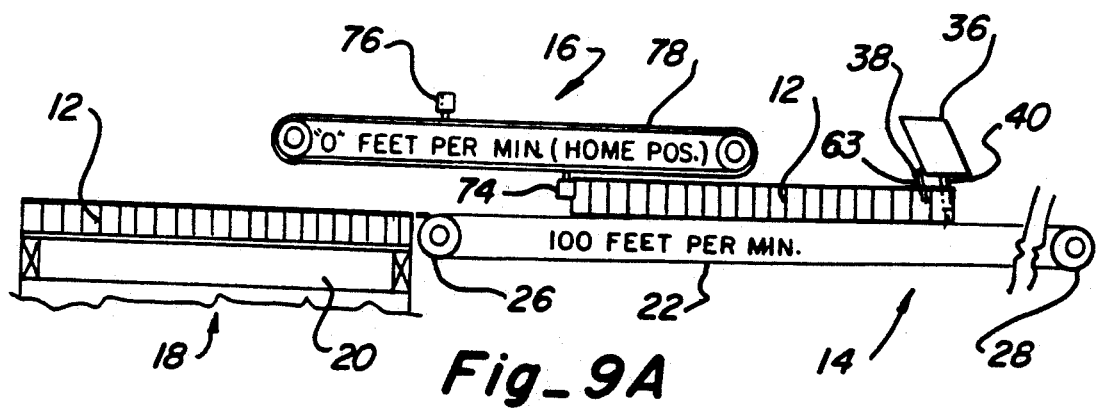
Fig_9A
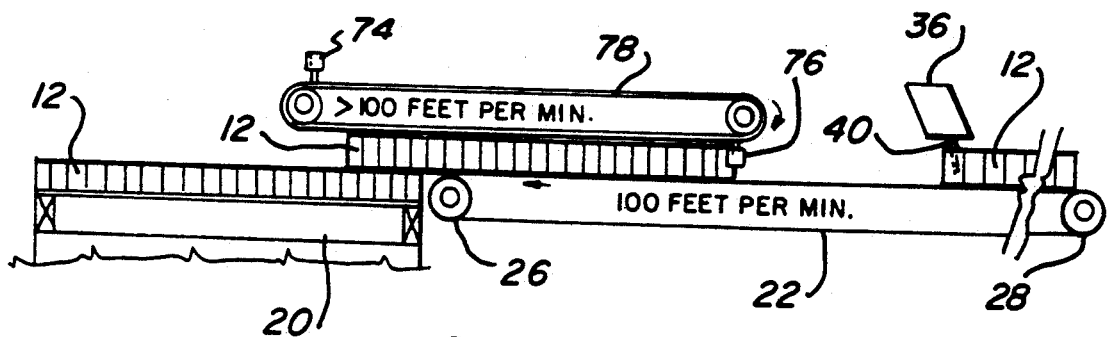
Fig_9B
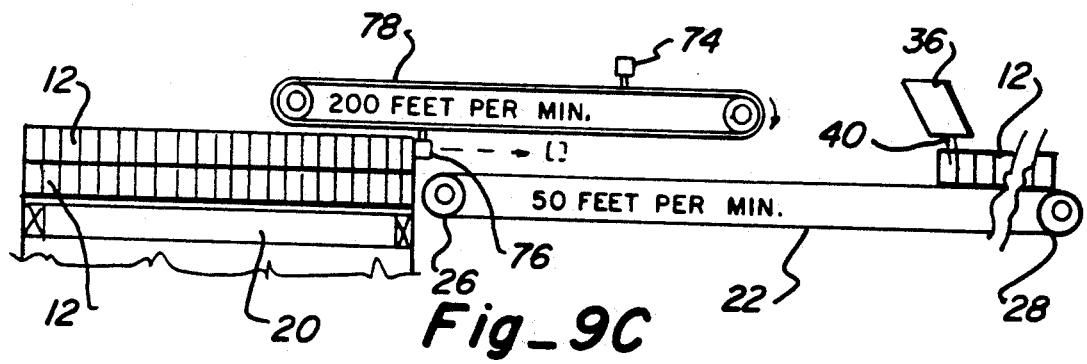
Fig_9C
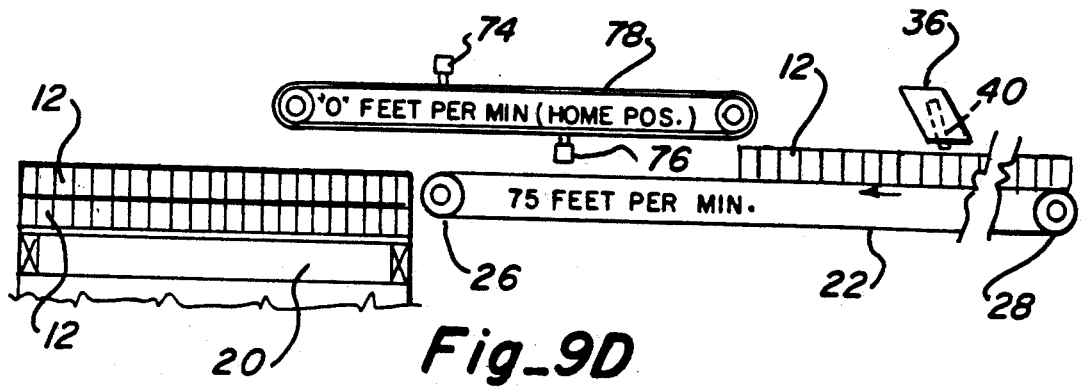
Fig_9D

DEVICE AND METHOD FOR REPEATEDLY FORMING A PRESELECTED ARRANGEMENT OF CONVEYED ARTICLES

FIELD OF THE INVENTION

This invention relates to arranging conveyed articles, and, more particularly, relates to palletizing tiers of articles in a preselected arrangement.

BACKGROUND OF THE INVENTION

It is oftentimes necessary to convey articles between different locations and/or form the articles into a suitable arrangement for a particular purpose. Where cylindrical articles, such as cans, are to be conveyed from location to location, it is well known that such articles can be conveyed along a belt from one location to another.

It is also now known that conveyed cylindrical articles can be formed into a single line (see, for example, U.S. Pat. Nos. 4,500,229, 4,730,955 and Re. 32,684) or formed into a plurality of rows, including being formed into a nested relationship (see U.S. Pat. Nos. 2,535,880, 3,685,632, 4721,419, 4,834,605 and 4,934,508).

It is likewise known that articles can be repeatedly conveyed by groups of articles, such as by tiers of articles to be palletized (see, for example, U.S. Pat. Nos. 4,759,673, 4,834,605 and 4,934,508). It is also known that tiers of articles can be conveyed to a palletizer using a sweep arrangement (see, for example, U.S. Pat. No. 3,934,713).

In addition, it is also known that a Number One Stagger arrangement of articles, such as cans, can be effected by use of a can pick-up unit for removing cans and then later inserting the cans with the cans being transversely shifted to thereby achieve the needed arrangement for palletizing the cans (see, for example, U.S. Pat. No. 4,154,347).

Finally it is known that articles can be placed by tiers on a pallet with such tiers normally having a sheet placed between each tier on the pallet (see, for example, U.S. Pat. No. 4,759,673).

SUMMARY OF THE INVENTION

This invention provides improved device and method for repeatedly forming a preselected arrangement of conveyed articles, such as cylindrical articles and particularly cans, including repeatedly forming tiers of palletized articles, with the articles in each tier being in a pattern, such as a Number One Stagger arrangement, if then needed.

The device includes accumulating means, conveying means for conveying articles through an accumulating area and a sweep area, stop means to repeatedly allow groups having preselected numbers of articles to pass from the accumulating area to the sweep area, repositioning means for rotating preselected articles to remove and then later insert the removed articles if a Number One Stagger arrangement is to be formed, sweep means for leading and pushing articles through the sweep area toward a receiving means, such as a palletizer when the articles are to be palletized, and control means for controlling operation of the conveying means, stop means, repositioning means if then utilized, and sweep means with the conveying means and the sweep means being each operated at different speeds during passage of each group of articles through the sweep area in conjunction with the repositioning means, if then utilized, to repeatedly form the desired arrangement at the receiving area, such as, for example, cans in a Number One Stagger arrangement on a pallet.

It is therefore an object of this invention to provide improved device and method for repeatedly forming a preselected arrangement of articles.

It is another object of this invention to provide improved device and method for repeatedly forming a preselected arrangement of tiers of articles on a pallet.

It is still another object of this invention to provide improved device and method for repeatedly forming articles into a Number One Stagger arrangement by tiers on a pallet.

It is yet another object of this invention to provide improved device and method for repeatedly forming articles into a preselected orientation wherein articles are caused to be conveyed by groups with such conveyance including movement of such articles at different speeds by both a belt conveyor and sweep arms operating in conjunction with a stop unit passing the articles by groups and a repositioning unit for effecting a Number One Stagger arrangement when utilized.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which:

FIG. 1 is a partial perspective view illustrating the device of this invention:

FIG. 2 is a partial top view of the device shown in FIG. 1;

FIG. 3 is a partial side view of the device shown in FIGS. 1 and 2;

FIG. 4A is a side view of the stop unit without inclusion of the repositioning unit;

FIG. 4B is an end view of the stop unit shown in FIG. 4A;

FIG. 5A is a side view of the combined stop and repositioner units;

FIG. 5B is an end view of the combined stop and repositioner units shown in FIG. 5A;

FIGS. 6A and 6B are sketches illustrating operation of the device utilizing the combined stop and repositioner units;

FIG. 7 is a partial perspective view illustrating article rotation by the repositioner unit;

FIG. 8A is a side view of the sweep unit shown positioned over a belt conveyor, dead plate and pallet;

FIG. 8B is a top view of the sweep unit as shown in FIG. 8A; and

FIGS. 9A through 9D are sketches illustrating operation of the stop, conveyor and sweep units.

DESCRIPTION OF THE INVENTION

As best shown in FIGS. 1 through 3, this invention allows received articles 12 (such as cylindrical articles and particularly cans as illustrated) to be conveyed through accumulating area 14 and sweep area 16 in a manner such that a predetermined arrangement of articles is repeatedly conveyed to receiving area 18.

While not essential for some uses, it is preferred that articles received at accumulator area 14 either be in a pattern when received or be arranged in a pattern at accumulator area 14, which pattern is preferably a nested arrangement when used in connection with a pallet 20 for palletizing articles at receiving area 18. A nested arrangement of articles is known as brought out in the background set forth above.

As shown in FIG. 1, an endless belt conveyor 22 extends through both accumulating area 14 and sweep area 16 to receive articles to be conveyed. As also shown, side rails 24 are provided at the opposite sides of belt 22 to maintain articles on the belt conveyor.

As also shown, endless belt conveyor 22 extends around rollers 26 and 28 (journaled for rotation on main frame 30), with roller 26 being rotatively driven by electric motor 32 through gear box 33. Motor 32 is preferably a constant torque, variable speed motor the speed of which is controlled by control unit 34 (control unit 34 is preferably a programmable microprocessor controller capable of energizing motor 32 to cause the motor to operate at varying speeds during predetermined portions of each cycle of operation of the device).

Stop unit 36 is provided at discharge end 37 of accumulating area 14. Stop unit 36 may be operated as an independent unit as shown in FIGS. 4A and 4B, or may be operated in conjunction with repositioner unit 38 as shown in FIGS. 5A and 5B.

As shown in FIGS. 4A and 4B, stop unit 36 includes a plurality of spaced fingers, or plungers, 40 each of which is inserted into a different one of the leading row of articles 12 extending transversely across the top of endless belt conveyor 22. Sufficient fingers must be provided to assure against passage of articles past the stop unit when the stop unit is in the stop position as shown in FIGS. 4A and 4B (with a nested arrangement, plungers are inserted into the lead article of every other longitudinally extending row of articles).

As best shown in FIGS. 4A and 4B, plungers 40 are mounted along arm 42, which arm is mounted on brackets 44 positioned at the outer edges of movable frame 46. Brackets 44 have a bore 47 therein to receive a rod 49 mounted at opposite ends on rod mount 50 so that brackets 44 can slide in either direction along rod 49.

Pneumatic cylinder 52 is mounted on main frame 30 (as is rod mount 50), and piston 53 of pneumatic cylinder 52 is connected with movable frame 46 through piston linkage 54 so that plungers 40 are moved (in a generally vertical direction) toward and away from articles due to movement of piston 53 moving brackets 45 along rod 49. As best indicated in FIG. 4A, a second pneumatic cylinder 56 is connected to main frame 30 and piston 58 of pneumatic cylinder 56 is connected to rod mount 50 so that rod 49 is rotated about pivot pin 60 received through an aperture in main frame 30 and an aperture in flange 61 of rod mount 50 to cause plungers 40 to be rotated in an arc parallel to the intended direction of article travel in passing from accumulating area 14 to sweep area 16.

Plungers 40 (which may be tapered at the lower end as shown if FIG. 4A) are rotated and lowered into articles 12 to establish a stop position of stop unit 36 (as shown in FIGS. 4A and 4B) and are rotated and raised from articles 12 to establish a pass position of stop unit 36 by pneumatic cylinders 52 and 56 operated by solenoids under the control of control unit 34.

For effecting some preselected patterns, and particularly for effecting a Number One Stagger arrangement, repositioner unit 38 is used. As best shown in FIGS. 5A and 5B, repositioner unit 38 operates using a vacuum applied through a vacuum inlet 62 to a plurality of spaced suction elements 63 (although magnetic or gripping fingers, for example, might also be utilized) with each suction element being inserted into a different one of articles 12 extending transversely across the top of endless belt conveyor 22. As best shown in FIG. 6A, suction elements 63 are inserted in alternate rows of articles adjacent to, but offset from, articles having plungers 40 of stop unit 36 inserted therein (assuming a nested arrangement of articles as illustrated in FIGS. 6A and 6B) with suction elements 63 being inserted in the transverse row immediately downstream from the row having plungers 40 inserted therein. When removed articles are later inserted, the articles are transversely shifted by cylinder 64, connected with frame 46, and piston 65, connected with arm 66 through slider 67, as indicated in FIG. 5A, with operation being controlled by a solenoid that is controlled by control unit 34.

As shown in FIG. 5B and 6A, an additional plunger 68 of stop unit 36 is inserted into one article (near one edge of the conveyor belt) in transverse alignment with suction elements 63. As brought out hereinafter, this allows the longitudinally extending outer row (i.e., extending in the intended downstream direction of travel of articles) to be displaced rearwardly by one article diameter (while shown in FIGS. 6A and 6B to be the left outer row that is displaced, the right outer row could be displaced instead of the left outer row if desired).

As best shown in FIGS. 5A and 5B, suction elements 63 are mounted along arm 66, and arm 66 is connected with pivot element 69 to pivot about pin 70 connected with movable frame 46 of stop unit 36. Pivot element 69 is connected to piston 71 of pneumatic cylinder 72 (allowing movement of piston 71 along pivot element 69, such as sliding movement, as necessary to accommodate transverse shifting of the repositioner unit), and pneumatic cylinder 72 is connected with movable frame 46 so that actuation of piston 71 by a solenoid under the control of control unit 34 causes suction elements 63 to be rotated in an arc parallel to the direction of intended downstream travel of articles 12 toward sweep area 16 from accumulator area 14. Since repositioner unit 38 is connected with movable frame 46 of stop unit 36, repositioner unit 38 is also moved upwardly and downwardly along with stop unit 36.

When the repositioner unit is utilized, articles to be repositioned are contacted by suction elements 63 and rotated out of the path of the articles following behind the articles being removed (i.e., the articles travelling along conveyor belt 22 toward sweep area 16, as is shown in FIG. 7). For a Number One Stagger arrangement, the articles removed from a first group of articles passed by stop unit 36 are removed and then later inserted into a third group of articles by rotation of the articles in the opposite direction, as brought out more fully hereinafter.

The articles passing the stop unit (and not removed by the repositioner unit, if utilized) are conveyed into sweep area 16 by conveyor belt 22. Conveyor belt 22 preferably extends to dead plate 73 positioned adjacent to receiving area 18. At sweep area 16, the transverse leading row of articles come into contact with sweep arm 74 of sweep unit 75 (shown in FIGS. 8A and 8B), and sweep arm 74 leads the articles through the sweep area toward receiving area 18. Sweep unit 75 is shown to include dual sweep arms 74 and 76 (which arms are preferably contoured as shown in FIG. 8B) and arms 74 and 76 are mounted on endless chain 78 so that the sweep arms are alternately moved through the sweep area (as best shown in FIGS. 9A through 9D, sweep unit 75 extends over dead plate 73 and a portion of receiving area 18), with sweep unit 75 including transverse support bars 79.

While dual sweep arms are shown herein, three sweep arms could be utilized for some uses (such as, for example, for less stable articles) to allow two arms to lead and push articles for a greater length of time than when dual sweep arms are utilized. When three sweep arms are utilized, operation is essentially the same as outlined herein for dual arms except that one arm is not utilized for each group of articles conveyed.

Chain 78 is wrapped about sprocket wheels 80 and 81 at each side of the device with wheels 81 at opposite sides of the device being mounted on rod 82 so that wheels 81 are rotatively driven by electric motor 83 through gear box 84, the speed of motor 83 being controlled by control unit 34, preferably through a closed loop servo system, so that the sweep arms are moved at different speeds, by increments, and reversed in direction as needed, as brought out more fully hereinafter.

After sweep arm 74, acting as a stabilizer, has led the first group of articles into the receiving area, arm 74 is rotated up out of the path of the articles (about sprocket wheel 81) and arm 74 is thereafter moved rearwardly (i.e., upstream with respect to article travel) above the articles while sweep arm 76 (which initially was moving rearwardly above the articles) is now rotated down (about sprocket 80) to be behind the first group of articles and sweep arm 76 then pushes the articles into the receiving area, after which arm 76 is moved rearwardly to act as a leader for the second group of articles. Thus, each time the articles are moved by groups (or tiers), one sweep arm leads the articles while the other sweep arm later pushes the articles, with the sweep arms alternately serving as a leader and then a pusher.

At receiving area 18, receiving means, such as palletizer unit 85, is utilized for receiving articles for effecting a particular end (such as placing the articles on a pallet when palletizer unit 85 is utilized). Palletizer unit 85 can be a known palletizer and preferably is a palletizer of the type shown in U.S. Pat. No. 4,759,673. When a palletizer is used, each tier of articles is conveyed onto pallet 20 at the palletizer (which normally includes side rails and an end rail to maintain the articles of each tier in the palletizer) and a separator sheet is normally placed between each tier with the tiers being stacked vertically on the conveyor as is common.

When a palletizer is used as shown in U.S. Pat. No. 4,759,673, the separator sheets are transferred by a sheet transfer unit that lifts the sheets vertically, and, when so lifted, the sweep arms of the sweep unit cannot extend outwardly over the palletizer when sheet transfer is to be accomplished. By utilizing sweep arms as set forth herein and controlling movement of the sweep arms (sweep unit 75 has no portion extending into the area above the palletizer except for the sweep arms), it has been found that a satisfactory sweep can be accomplished and the arms do not extend over the palletizer during sheet transfer.

Control unit 34 is accessible to an operator, and when programmed, controls application of electrical power to electric motors 32 and 83 (driving conveyor belt 22 and sweep unit 75) and controlling application of fluid (normally air) to pneumatic cylinders 52, 56, 64 and 72. Sensor 86 (specifically illustrated in FIG. 1 to sense the presence of the sweep arm at home position) is preferably a proximity detector (where the sensed element is metallic), and this sensor may, if desired, be used with additional sensors, proximity and/or optical sensors, for example, to sense movement and/or position of the movable portions of each unit and/or article movement thereat for monitoring and/or timing purposes, it being appreciated that the movable portions must operate in the manner and in the sequence as set forth hereinafter. It is also to be appreciated that timing and sequencing could be carried out by a timing unit and associated sensors carrying out the steps of operation as set forth hereinafter.

Operation of the device with the repositioner unit not being utilized is as follows for each cycle: as indicated in FIG. 9A, sweep unit 75 is at (or brought to) a home position, stop unit 36 is in (or brought to) the pass (up) position, conveyor belt 22 is operating (or brought to operation) at its designated fast speed (preferably about 130 to 140 feet per minute for aluminum cans and 100 feet per minute for steel cans), and a preselected number of articles to form a group of articles have been conveyed by conveyor belt 22 toward sweep arm 74 to thereby be positioned between sweep arm 74 and stop unit 36 (at commencement of operation, no articles are positioned between sweep arm 74 and stop unit 36); stop unit 36 is moved to the stop (down) position with plungers 40 being inserted in the transverse lead row of articles (i.e., the transverse row of articles immediately behind sweep arm 74); sweep arm 74 is moved forward (i.e., in the downstream direction of intended article movement) at a designated slow speed (which speed is slightly slower than that of the fast speed of belt 22) so that articles are led by sweep arm 74 through the sweep area and into the receiving area; after sweep arm 74 is indexed at the up position and sweep arm 76 is indexed to the down position, as shown in FIG. 9B, the speed of conveyor belt 22 is decreased to a slow speed (about half that of the fast speed of conveyor belt 22) and the speed of sweep unit 75 is increased to a speed about double that of the slow speed of sweep unit 75 (which speed is then greater than that of belt 22), and sweep arm 76 pushes the articles onto the receiving means (such as a pallet when the receiving means is a palletizer); after all articles in the group (or tier) have been positioned at the receiving means by sweep arm 76, the direction of movement of sweep arm 76 is reversed and sweep arm 76 is moved upstream (with respect to the intended direction af article movement) to the home position, as shown in FIG. 9C: plungers 40 of stop unit 36 are moved forward a short distance (about one inch for articles having a diameter of about 2.5 inches and proportionately less for articles having a smaller diameter) and is brought to the pass (up) position while the sweep arm is returning to home position and conveyor belt 22 is increased in speed (to a speed about three-fourths of the fast speed of conveyor belt 22) to move a second group (or tier) of articles toward sweep arm 76 (which is now a lead, or stabilizer, bar), as shown in FIG. 9D.

The operation is then repeated for each group, or tier, of articles to be positioned on the receiving means (or palletizer).

Operation of the device with repositioner unit 38 utilized and tiers of articles conveyed to a palletizer in a Number One Stagger arrangement is as follows for each cycle: as indicated in FIG. 9A, sweep unit 75 is at (or brought to) a home position, stop unit 36 is in (or brought to) the pass (up) position, suction elements 63 of the repositioner unit are rotated down with respect to stop unit 36, vacuum to the suction elements is off, stop unit 36 is shifted to an A position (i.e., shifted away from displacement block 87 on sweep arm 74), conveyor belt 22 is operated at fast speed (as above set forth), and a preselected number of articles to form a third tier of articles is positioned between sweep arm 74 and stop unit 36 (at commencement of operation, no articles are positioned between sweep arm 74 and stop unit 36); sweep unit 75 is indexed forward one-half diameter of the articles, stop unit 36 is moved to the stop (down) position with plungers 40 being inserted in the second transverse row of articles immediately behind sweep arm 74, and suction elements 63 of repositioner unit 38 are inserted in the first transverse row immediately following sweep arm 74 (except that plunger 68 is inserted in the lead row of articles adjacent to displacement block 87), as shown in FIG. 6A; vacuum is applied to suction elements 63 and sweep arm 74 is moved in the downstream direction at a designated slow speed (as set forth above); repositioning unit 38 is rotated in the downstream direction parallel to the direction of intended article movement to rotate the articles in contact with suction elements 63 to thereby position the removed articles out of the path of travel of the following articles, as shown in FIG. 7; sweep arm 74 continues to move forward (i.e., in the downstream direction of article travel) at the slow speed (which speed is slower than that of belt 22) so that the articles of a first tier are led by sweep arm 74 through the sweep area and onto the palletizer; after sweep arm 74 is indexed to the up position and sweep arm 76 is indexed to the down position as shown in FIG. 9B, the speed of conveyor belt 22 is decreased to a slow speed (about half that of the fast speed of conveyor belt 22) and the speed of sweep unit 75 is increased to a speed about double that of the slow speed of sweep unit 75 (which speed is then greater than that of conveyor belt 22) and sweep arm 76 pushes the articles onto the palletizer; after all articles of the first tier are on the palletizer, the direction of movement of sweep arm 76 is reversed and sweep arm 76 is moved upstream (with respect to the intended direction of article movement) to the home position, as shown in FIG. 9C; stop unit 36 is moved forward a short distance (about one inch for articles having a 2.5 inch diameter and proportionately less for articles having a smaller diameter), brought to the pass (up) position and shifted to a B position (i.e., toward displacement block 87 as shown in FIG. 6A) while the sweep arm is returning to home position, and conveyor belt 22 is increased in speed (to a speed that is about three-fourths of the fast speed of conveyor belt 22) to move a second tier of articles toward sweep arm 76 (which is now a lead, or stabilizer, bar), as shown in FIG. 9D; and conveyor belt 22 is then returned to fast speed and ready to convey the second and third tiers of articles to the palletizer.

The second and third tiers of articles are conveyed as follows: stop unit 36 is moved downward to the stop position with plungers 40 in contact with the then front row of articles of the third tier; sweep arm 76 starts to move at its slow speed with conveyor belt 22 operating at its fast speed so that sweep arm 76 starts to lead the second tier of articles into the palletizer; repositioner unit 38 rotates the previously removed articles to conveyor belt 22 to form a new front transverse row of articles of the third tier, after which the vacuum on suction elements 63 is removed; the speed of conveyor belt 22 is decreased by about one-half and the speed of sweep arm 74 is increased to about double when sweep arm 76 is indexed to the up position and sweep arm 74 is indexed to the down position so that sweep arm 74 pushed the second tier of articles onto the palletizer, after which the direction of movement of sweep arm 74 is reversed to move sweep arm 74 upstream to the home position; stop unit 36 is moved forward a short distance (about one inch for articles having a 2.5 inch diameter and proportionately less for articles having a smaller diameter), brought to the pass (up) position and shifted to the A position (i.e., away from displacement block 87) while the sweep arm is returning to the home position, and conveyor belt 22 is increased in speed (to a speed that is about three-fourths of the fast speed of conveyor belt 22) to move the third tier of articles toward sweep arm 74 (which is now again a lead, or stabilizer bar).

The cycle of operation is then repeated for each group of three tiers of articles positioned on the palletizer to form a Number One Stagger arrangement of articles on the palletizer.

As can be appreciated from the foregoing, this invention provides improved method and apparatus for repeatedly forming a preselected arrangement of articles and provides improved forming of tiers of cylindrical articles at a palletizer, including forming of such tiers into a Number One Stagger arrangement.

What is claimed is:

1. A device for repeatedly forming a predetermined arrangement of articles, said device comprising:

accumulating means at an accumulating area for receiving articles to be formed into said predetermined arrangement, said accumulating area having a discharge end for discharging articles therefrom in a predetermined direction;

stop means movable between a stop position and a pass position, said stop means when in said stop position being engagable with articles at said discharge end of said accumulating area for preventing said articles from passing by said stop means in said predetermined direction, and said stop means when in said pass position allowing articles from said accumulating area to pass by said stop means in said predetermined direction;

sweep means including first and second sweep arms operable within at least a sweep area for engaging articles passed by said stop means;

conveyor means at least said sweep area for engaging articles and urging said engaged articles in said predetermined direction through said sweep area;

receiving means for receiving articles from said sweep area; and control means controlling operation of said stop means between said stop and pass positions to enable preselected numbers of articles to be passed by said stop means each time said stop means is in said pass position, and said control means also controlling said sweep means and said conveyor means with both said sweep means and said conveyor means being caused to be operated at varying speeds, including at least two speeds other than zero speed, so that articles are conveyed to said receiving means from said sweep means in said predetermined arrangement.

2. The device of claim 1 wherein each of said sweep arms is alternately utilized to lead and push said articles through said sweep area to said receiving means.

3. The device of claim 1 wherein said control means causes said sweep means to be reversed in direction in conveying said articles through said sweep area.

4. The device of claim 1 wherein said conveying means is operated at three different speeds and said sweep arms of said sweep means are operated at two different speeds in conveying said articles through said sweep area.

5. The device of claim 1 wherein said receiving means includes palletizing means, and wherein said sweep means conveys articles by tiers to said palletizing means.

6. A device for repeatedly forming a predetermined arrangement of articles, said device comprising:

accumulating means at an accumulating area for receiving articles to be formed into said predetermined arrangement, said accumulating area having a discharge end for discharging articles therefrom in a predetermined direction;

stop means movable between a stop position and a pass position, said stop means when in said stop position being engagable with articles at said discharge end of said accumulating area for preventing said articles from passing by said stop means in said predetermined direction, and said stop means when in said pass position allowing articles from said accumulating area to pass by said stop means in said predetermined direction;

sweep means including first and second sweep arms operable within at least a sweep area for engaging articles passed by said stop means, said sweep arms being operated at different speeds and reversed in direction in conveying said articles passed by said stop means through said sweep area;

conveyor means at least said sweep area for engaging articles and urging said engaged articles in said predetermined direction through said sweep area;

receiving means for receiving articles from said sweep area; and control means controlling operation of said stop means between said stop and pass positions to enable preselected numbers of articles to be passed by said stop means each time said stop means is in said pass position, and said control means also controlling said sweep means and said conveyor means with both said sweep means and said conveyor means being caused to be operated at varying speeds so that articles are conveyed to said receiving means from said sweep means in said predetermined arrangement.

7. A device for repeatedly forming a predetermined arrangement of conveyed cylindrical articles, said device comprising;

accumulating means at an article accumulating area for receiving cylindrical articles to be formed into said predetermined arrangement, said accumulating area having a discharge end for discharging articles from said accumulating area in a predetermined direction;

stop means movable between a stop position and a pass position, said stop means when in said stop position being engagable with articles at said discharge end of said accumulating area for preventing said articles from passing by said stop means in said predetermined direction, and said stop means when in said pass position allowing articles from said accumulating area to pass by said stop means in said predetermined direction;

repositioning means operable in conjunction with said stop means for removing preselected ones of said articles passed by said stop means and later inserting said removed preselected ones of said articles whereby said articles pass said stop means and said repositioning means by groups;

sweep means including first and second sweep arms operable at least within a sweep area for causing articles passed by said stop means and said repositioning means to be conveyed through said sweep area and discharged therefrom;

receiving means at a receiving area for receiving articles discharged from said sweep area; and control means controlling operation of said stop means and said repositioning means whereby said stop means passes a preselected number of articles each time that said sweep means is in said pass positon, and for controlling said sweep arms of said sweep means so that said sweep arms are moved at different speeds in conjunctin with control of said stop means and said repositioning means in conveying said articles through said sweep area and into said receiving area to thereby repeatedly convey said articles by groups to said receiving means.

8. The device of claim 7 wherein said accumulating means receives said articles in a nested arrangement, wherein said receiving means includes palletizing means, and wherein said sweep means conveys said articles to said palletizing means in said nested arrangement.

9. The device of claim 7 wherein said repositioning means includes article displacement means for moving said articles along a rotational path so that said preselected ones of said articles are removed in a predetermined direction and for moving said removed articles along said rotational path in the opposite direction to later insert said removed articles.

10. The device of claim 7 wherein each of said first and second sweep arms of said sweep means alternately leads and pushes articles conveyed through said sweep area.

11. The device of claim 7 wherein said device includes conveyor means for conveying articles through said accumulating area and said sweep area, and wherein said control means causes said articles conveyed by said conveyor means to be conveyed at different speeds in conjunction with operation of said sweep at different speeds.

12. A device for palletizing cylindrical articles, said device comprising:

accumulating means at an accumulating area for receiving articles to be formed into tiers for palletizing, said accumulating area having a discharge end for conveying articles therefrom in a predetermined direction;

stop means movable between a stop position and a pass position, said stop means when in said stop position being engagable with articles at said discharge end of said accumulating area for preventing said articles from passing by said stop means in said predetermined direction, and said stop means when in said pass position allowing articles from said accumulating area to pass by said stop means in said predetermined direction;

article repositioning means operable in conjunction with said stop means for engaging preselected articles that pass said stop means and removing said preselected articles, said article repositioning means later inserting said removed preselected articles when said stop means is in said stop position whereby articles pass said stop means and said repositioning means by groups;

sweep means including at least first and second sweep arms operable within a sweep area for engaging articles passed by said stop means and said article repositioning means;

conveying means for conveying articles discharged from said discharge end of said accumulating means through at least said sweep area whereby said conveying means and said sweep means cause said groups of articles to be conveyed by tiers through said sweep area and discharged therefrom;

palletizing means for receiving said tiers of articles discharged from said sweep area; and control means for controlling operation of said stop means and said articles repositioning means whereby a sufficient number of articles to form a first tier plus said preselected articles to be removed are passed by said stop means while in a first pass position, a sufficient number of articles to form a second tier are passed by said stop means while in a second pass position, and a sufficient number of articles to form a third tier minus said preselected number of articles to be inserted are passed by said stop means while in a third pass position, said control means also causing said conveying means and said sweep means to be operated at different speeds during movement of said articles through said sweep means and onto said palletizing means in conjunction with control of said stop means and said article repositioning means to thereby cause said preselected articles to be removed while said stop means is in said first pass position and to be inserted while said stop means is in said third pass position whereby said sweep means conveys articles by like tiers to said palletizing means.

13. The device of claim 12 wherein said articles conveyed by said conveying means to said sweep means are in nested arrangement, wherein said article repositioning means is side shifted before inserting articles in said third tier, and wherein said sweep means causes tiers of articles in nested arrangement to be provided to said palletizing means.

14. The device of claim 12 wherein said device includes pivotable mounting means for mounting said article repositioning means thereon whereby said articles are removed and inserted at least in part by displacing said articles along a rotational path.

15. The device of claim 12 wherein each of said sweep arms alternately leads and pushes said tiers of articles through said sweep area.

16. The device of claim 12 wherein said controlling means causes said conveying means to be moved at three different speeds during movement of each tier of articles through said sweep area, and wherein said controlling means causes said sweep arms to be moved at two different speeds during movement of each tier of articles through said sweep area.

17. The device of claim 16 wherein said conveying means is moved at a first speed, a second speed that is substantially double that of said first speed, and third speed that is between said first and said second speeds, and wherein said sweep arms are moved at a first speed slower than that of said first speed of said conveying means and at a second speed that is greater than that of said first speed of said conveying means.

18. The device of claim 12 wherein said sweep means is reversed in direction and moved to a home position each time after a sweep arm has pushed a tier of articles onto said palletizing means.

19. The device of claim 12 wherein at least one of said sweep means and said stop means is additionally moved in said predetermined direction of article movement by a small increment to facilitate positioning of articles for movement through said device.

20. The device of claim 12 wherein said tiers of articles conveyed through said sweep area are in longitudinally extending rows, and wherein each of said sweep arms includes a displacement block for engaging one of said articles in one of said rows of each said tier to move said engaged articles and the row in which said article is positioned rearwardly one article diameter with respect to articles in adjacent rows.

21. A method for repeatedly forming a predetermined arrangement of articles, said method comprising:
providing articles at an accumulating area;
repeatedly allowing a preselected number of said articles to move from said accumulating area to a sweep area; and
providing sweep means having first and second sweep arms and conveying means at said sweep area to engage articles and convey said articles to a receiving area, and causing both said sweep means and said conveying means to be operated at varying speeds, including at least two speeds other than zero speed, for repeatedly forming said articles into said predetermined arrangement.

22. The method of claim 21 wherein said method includes providing articles to said accumulating area in a nested arrangement, and wherein said sweep means and said conveying means convey said articles through said sweep area and discharge said articles in said nested arrangement to a receiving area.

23. The method of claim 21 wherein said sweep means is reversed in direction in conveying said articles through said sweep area.

24. The method of claim 21 wherein said articles are moved at three different speeds by said conveying means in conjunction with movement of said sweep means at two different speeds.

25. The method of claim 24 wherein said articles are initially moved by said conveying means at a predetermined fast speed, wherein said articles are later moved by said conveying means at a speed of about one-half that of said predetermined fast speed, and wherein said articles are later moved by said conveying means at a speed of about three-fourths that of said predetermined fast speed, and wherein said sweep means is moved at an initial speed less than that of said predetermined fast speed of said conveying means and then is later moved at a speed greater than that of said predetermined fast speed of said conveying means.

26. A method for repeatedly forming a predetermined arrangement of articles, said method comprising:

providing articles at an accumulating area;

repeatedly allowing a preselected number of said articles to move from said accumulating area to a sweep area; and providing sweep means and conveying means at said sweep area to engage articles and convey said articles to a receiving area, at least one of said sweep means and said conveying means being operated at varying speeds for repeatedly forming said articles into said predetermined arrangement, and said sweep means being reversed and moved to a home position when said articles have been conveyed to said receiving area.

27. A method for palletizing cylindrical articles, said method comprising:

providing articles at an accumulating area;

repeatedly allowing groups of articles to be discharged in a downstream direction from said accumulating area;

removing predetermined ones of said articles discharged from said accumulating area and then later inserting said removed articles whereby like groups of articles are provided downstream of said accumulating area; and providing conveying means and sweep means that includes first and second sweep arms at said sweep area to engage each said like group of articles received from said accumulating area and, in conjunction with removal and insertion of articles, forming each said like group of articles into a tier that is cooperatively moved by said conveying means and said sweep arms of said sweep means to a palletizing area.

28. The method of claim 27 wherein a sufficient number of articles to form a first tier plus articles to be removed are first conveyed from said accumulating area, a sufficient number of articles to form a second tier are next conveyed from the accumulating area, and a sufficient number of articles to form a third tier less the articles to be inserted are last conveyed from said accumulating area with said articles to be removed being removed prior to said first tier reaching said sweep area and said articles to be inserted to form said third tier being inserted prior to said articles of said third tier reaching said sweep area whereby like tiers are conveyed to said palletizing area.

29. A method for palletizing cylindrical articles, said method comprising:

providing articles at an accumulating area;

repeatedly allowing groups of articles to be discharged from said accumulating area;

removing predetermined ones of said articles discharged from said accumulating area and then later inserting said removed articles; and providing conveying means and sweep means at said sweep area to engage each said group of articles received from said accumulating area and, in conjunction with removal and insertion of articles, forming each said group of articles into a tier that is cooperatively moved by said conveying means and said sweep means to a palletizing area, said conveying means being moved at a predetermined fast speed during initial movement of articles toward said sweep area and said sweep means being moved from a home position at a predetermined slow speed less than that of said fast speed of said conveying means, said conveying means being slowed to a speed equal to about one-half that of said fast speed after said articles have been removed and said sweep means being moved at a speed about twice that of the slow speed of said sweep means and greater than said fast speed of said conveying means, said sweep means being reversed in direction after said articles have been moved by said sweep means to said palletizing area to move said sweep means to said home position, said conveying means being thereafter moved to a speed between that of said first and second speeds to convey articles toward said home position of said sweep means, and said conveying means being then returned to said fast speed.

* * * * *